UNITED STATES PATENT OFFICE.

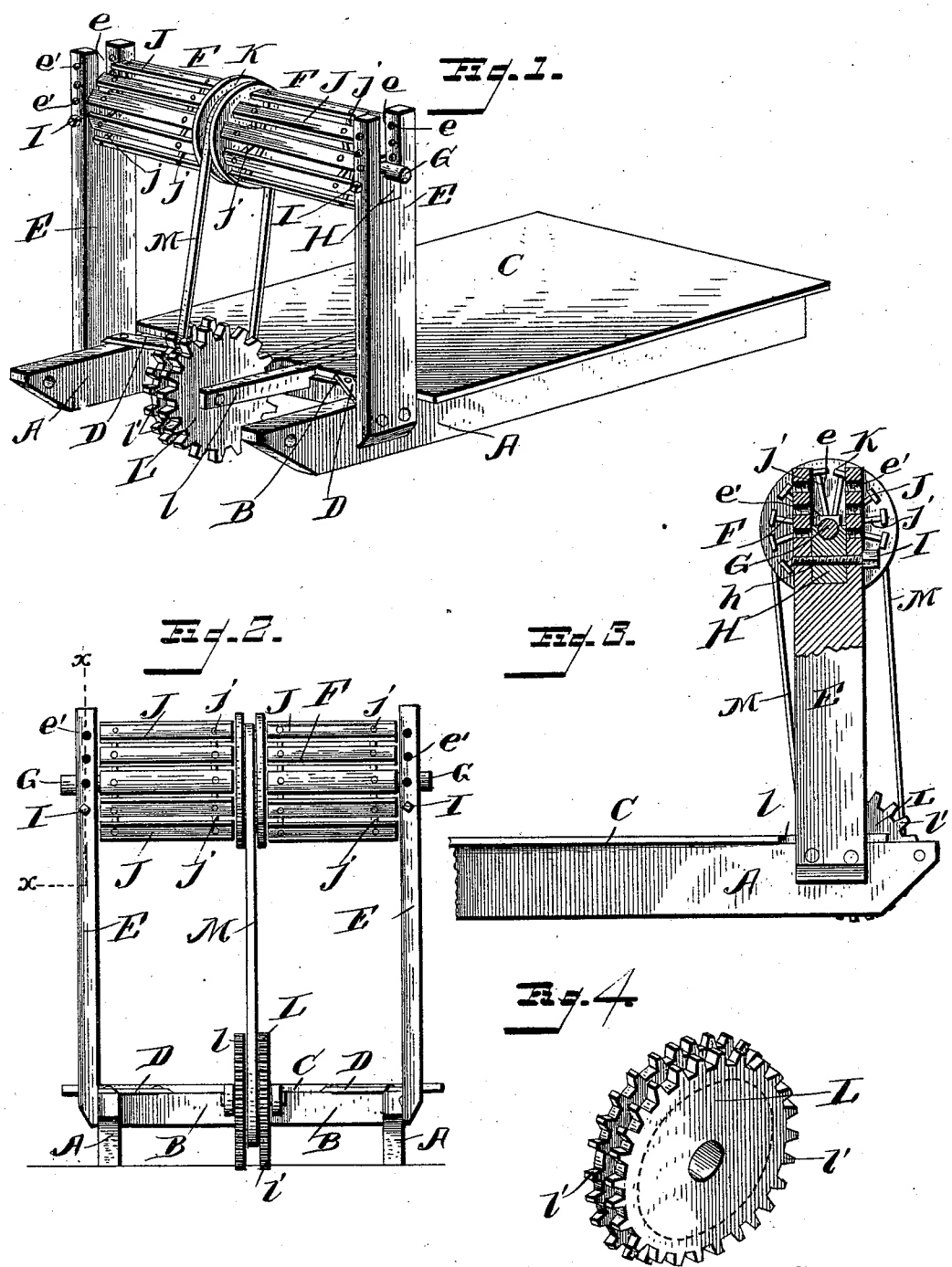

WILLIAM F. ZIEGLER, OF LINCOLN, KANSAS.

FODDER-CUTTER.

SPECIFICATION forming part of Letters Patent No. 498,202, dated May 23, 1893.

Application filed October 12, 1892. Serial No. 448,653. (No model.)

*To all whom it may concern:*

Be it known that I, WILLIAM F. ZIEGLER, a citizen of the United States, residing at Lincoln, in the county of Lincoln and State of Kansas, have invented certain new and useful Improvements in Fodder-Cutters; and I do hereby declare that the following is a full, clear, and exact description of the invention, which will enable others skilled in the art to which it appertains to make and use the same.

This invention relates to fodder cutters of that class designed for cutting two rows of stalks, and it has for its object to provide a simple and improved construction of double-reel designed for throwing the stalks upon the platform.

A further object of the invention is to provide simple and improved means for effecting vertical adjustment of the reel, and for rotating the latter.

To this end my invention consists, substantially, in the construction, combination and arrangement of parts, as will be hereinafter more fully described and particularly pointed out in the claim.

In the drawings—Figure 1 is a perspective view of a fodder cutter embodying my invention. Fig. 2 is a front end elevation. Fig. 3 is a vertical sectional view on the line $x-x$, Fig. 2. Fig. 4 is a detail perspective view of the drive-wheel detached.

Corresponding parts in all the figures are denoted by the same letters of reference.

Referring to the drawings, A A designate two parallel runners, which are connected by cross-pieces, B, the latter supporting a platform, C. Upon the forward cross-piece B and the forward ends of the runners A are secured two obliquely and reversely arranged knives, D D.

E E designate two parallel upright standards, which are secured at their lower ends to the forward ends of the respective runners. The upper portion of each of these standards is provided with a vertical slot, $e$, open at its upper end. At right angles to the slots $e$ and intersecting the same, the standards are provided with a series of vertically-arranged, coincident apertures, $e'$, the purpose of which will appear farther on.

F designates the reel, which is of a double form and comprises a shaft, G. The latter is preferably of angular form, and is provided near its ends with rounded bearing portions, $g\ g$, which are received by bearing-blocks, H H. These bearing-blocks are disposed in the slots $e\ e$ of the standards E, and are each provided with a bore, $h$, through which and the coincident apertures $e'$ is passed a securing bolt, I. Vertical adjustment of the reel is effected by the raising or lowering of the bearing-blocks and passing the bolt I through the next higher or lower aperture $e'$, as desired. The reels proper consist of cross-bars, $j$, passing through or secured to the shaft G, and to the outer ends of said cross-bars are secured the reel arms, J.

For revolving the reel, a grooved belt or chain-wheel, K, is provided, which is mounted centrally upon the shaft G. Over this wheel K and a grooved drive-wheel L is passed a drive-belt or chain, M. The wheel L is journaled between two forwardly-projecting arms, $l\ l$, and the location of said wheel is such that it will contact with the ground when the device is in operation. To afford positive movement to the wheel L the latter is provided at each side its groove with sprocket-teeth, $l'$. The groove in this wheel, it will be noted, is of such a depth, as to preclude contact of the drive-belt or chain with the ground.

The operation and advantages of my invention will be readily understood by those skilled in the art to which it appertains. The device may be drawn by means of traces attached to the cross piece B. When the machine is in operation the sprocket-teeth of the wheel L contact with the ground and serve to keep the reel continuously in motion. The runners straddle two rows of stalks, and as the machine moves forwardly the upper ends of the stalks are struck by the reel and forced rearwardly, and during the further movement of the machine the stalks are cut by the knives and deposited upon the platform.

I claim as my invention—

In a fodder cutter, the combination, with the frame comprising runners, and a platform mounted thereon, and cutting knives carried by the frame in advance of the platform, of standards secured to the forward ends of the runners, a double reel mounted in said standards and provided with a centrally-arranged, grooved belt or chain-wheel, a grooved belt or chain-wheel journaled in arms projecting from the frame and in vertical alignment with the belt or chain-wheel carried by the reel, the lower of said belt or chain-wheels being provided with sprockets at its periphery and adapted to contact with the surface of the ground; substantially as and for the purpose set forth.

In testimony whereof I affix my signature in presence of two witnesses.

WILLIAM F. ZIEGLER.

Witnesses:
ORPHEUS SPENCER,
E. A. WATERMAN.